United States Patent
Rai et al.

(10) Patent No.: US 9,723,554 B2
(45) Date of Patent: Aug. 1, 2017

(54) COLLABORATIVE POWER CONSCIOUS UTILIZATION OF EQUIPMENT IN A NETWORK

(71) Applicant: AT&T Mobility II LLC, Atlanta, GA (US)

(72) Inventors: Paritosh Rai, Dunwoody, GA (US); Arthur Richard Brisebois, Cumming, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 185 days.

(21) Appl. No.: 13/670,762

(22) Filed: Nov. 7, 2012

(65) Prior Publication Data

US 2014/0126441 A1 May 8, 2014

(51) Int. Cl.
*H04W 52/02* (2009.01)

(52) U.S. Cl.
CPC ... *H04W 52/0216* (2013.01); *H04W 52/0277* (2013.01); *Y02B 60/50* (2013.01)

(58) Field of Classification Search
CPC ......... H04W 52/0245; H04W 52/0261; H04W 52/0277
See application file for complete search history.

(56) References Cited

U.S. PATENT DOCUMENTS

| | | | |
|---|---|---|---|
| 7,280,853 B2 * | 10/2007 | Hassan et al. | 455/574 |
| 7,512,423 B2 | 3/2009 | Karaoguz | |
| 7,953,457 B2 | 5/2011 | Salomone et al. | |
| 8,095,106 B2 * | 1/2012 | Kone et al. | 455/343.1 |
| 8,126,461 B2 | 2/2012 | Sengupta et al. | |
| 8,254,924 B2 * | 8/2012 | Prakash et al. | 455/435.1 |
| 8,295,217 B2 * | 10/2012 | Kone et al. | 370/311 |
| 8,537,767 B2 * | 9/2013 | Zhang | H04W 52/365 37/252 |
| 8,804,546 B2 * | 8/2014 | Tenny et al. | 370/252 |
| 8,862,155 B2 * | 10/2014 | Stern | H04W 4/043 455/456.2 |
| 9,049,658 B2 * | 6/2015 | Ponmudi | H04W 52/0216 |
| 2007/0286222 A1 * | 12/2007 | Balasubramanian | 370/412 |
| 2008/0268917 A1 * | 10/2008 | Chang et al. | 455/574 |
| 2009/0247211 A1 * | 10/2009 | Kuroda | 455/522 |
| 2010/0146151 A1 * | 6/2010 | Jeong | G06F 15/173 709/242 |
| 2010/0232429 A1 * | 9/2010 | Rao et al. | 370/389 |
| 2010/0317374 A1 * | 12/2010 | Alpert et al. | 455/458 |
| 2011/0292852 A1 * | 12/2011 | Kone | 370/311 |
| 2012/0083200 A1 * | 4/2012 | Koh et al. | 455/7 |
| 2012/0201182 A1 * | 8/2012 | Kwon et al. | 370/311 |
| 2012/0281559 A1 * | 11/2012 | Ner et al. | 370/252 |

(Continued)

OTHER PUBLICATIONS

Rohde & Schwarz, Case Study Competition 2012, Apr. 12, 2012, Section 1, p. 3; Section 5, pp. 16-23 (http://www.fallstudienwettbewerb.de/fileadmin/customer/downloads/Aufgabenstellung/Vorrunde/2012/Vorrunde_2012_Aufgabenstellung_englisch_deutsch-50c1b8574fab7.pdf).*

(Continued)

*Primary Examiner* — Mounir Moutaouakil
(74) *Attorney, Agent, or Firm* — Baker & Hostetler LLP

(57) ABSTRACT

A communications device and network may collaborate to conserve battery life. The communications device may provide battery life status when attaching to a network. And the network may adjust treatment of the communications device depending upon the status.

18 Claims, 8 Drawing Sheets

(56) References Cited

U.S. PATENT DOCUMENTS

| | | | |
|---|---|---|---|
| 2012/0331421 A1* | 12/2012 | Mohammed | H04L 12/1407 715/841 |
| 2013/0238919 A1* | 9/2013 | Ponmudi | H04W 52/0216 713/323 |
| 2014/0098752 A1* | 4/2014 | Venkata et al. | 370/329 |

OTHER PUBLICATIONS

Rhode & Schwarz, Case Study Competition 2012, (Apr. 12, 2012), Section 5, pp. 16-18 (reference was on the record).*

* cited by examiner

COLLABORATIVE POWER CONSCIOUS UTILIZATION OF EQUIPMENT IN A NETWORK

TECHNICAL FIELD

The technical field generally relates to communications networks, and more specifically to collaborative power conscious utilization of equipment in a communications network.

BACKGROUND

Battery life is often on the minds of users of communications devices. Communications devices, such as smart phones for example, can perform multiple tasks at high data rates, and provide high resolution displays. With the rollout of new technologies, a communications device may operate under multiple technologies and multiple frequency bands. This may lead to increased signaling and associated battery consumption. In addition, with the explosion of applications downloadable from app stores, communications devices may tend to consume power at a more rapid rate. This drain on battery power of a communications device can lead to a user of the communications device frantically searching for a place to plug in his/her mobile device to recharge its battery.

SUMMARY

The following presents a simplified summary that describes some aspects or embodiments of the subject disclosure. This summary is not an extensive overview of the disclosure. Indeed, additional or alternative embodiments of the subject disclosure may be available beyond those described in the summary.

A communications device, also referred to as user equipment (UE) herein, and a communications network may collaborate to conserve battery life of the communications device. The communications device may provide battery life status when attaching to a network or when remaining power is low. And the network may adjust treatment of the communications device depending upon the status.

In an example embodiment, when a communications device detects that it has entered into low battery range, the communications device may initiate a battery conservation mode, wherein the communications device may activate power saving mechanisms on the communications device. The communications device also may inform the network of the low battery power status of the communications device and request special status and handling. The network may inform various network nodes within the network of the status of the communications device and assign special status to the communications device among the various network nodes. The network may work with communications device and coordinate all the processes to conserve communications device power.

Example mechanisms for conserving communications device power may include reducing signaling traffic to and from the communications device, adjusting display parameters on the communications device, bundling transmit and receive data on the communications device and/or in the network, adjust random access channel (RACH), discontinuous reception (DRX), and paging cycles, or the like.

BRIEF DESCRIPTION OF THE DRAWINGS

Reference is made here to the accompanying drawings, which are not necessarily drawn to scale.

DETAILED DESCRIPTION OF ILLUSTRATIVE EMBODIMENTS

Aspects of the instant disclosure are described more fully herein with reference to the accompanying drawings, in which example embodiments are shown. In the following description, for purposes of explanation, numerous specific details are set forth in order to provide an understanding of the various embodiments. However, the instant disclosure may be embodied in many different forms and should not be construed as limited to the example embodiments set forth herein. Like numbers refer to like elements throughout.

As described herein, the battery life of a communications device, also referred to as user equipment (UE), may be extended by the communications device working in conjunction with a communications network. This may be advantageous when the communications device is running out of battery power. In example embodiments, the communications device may initiate internal power conservation mechanisms and coordinate with the communications network to manage power control, paging, random access channel (RACH), and other signaling and data transmission to reduce unnecessary activity and conserve battery power. The herein described coordinated battery savings mechanisms between the communications device and the communications network may provide a mix of battery and network efficiencies and reduced call setup and data latencies tailored to reduce power consumption by the communications device.

Figure 1:
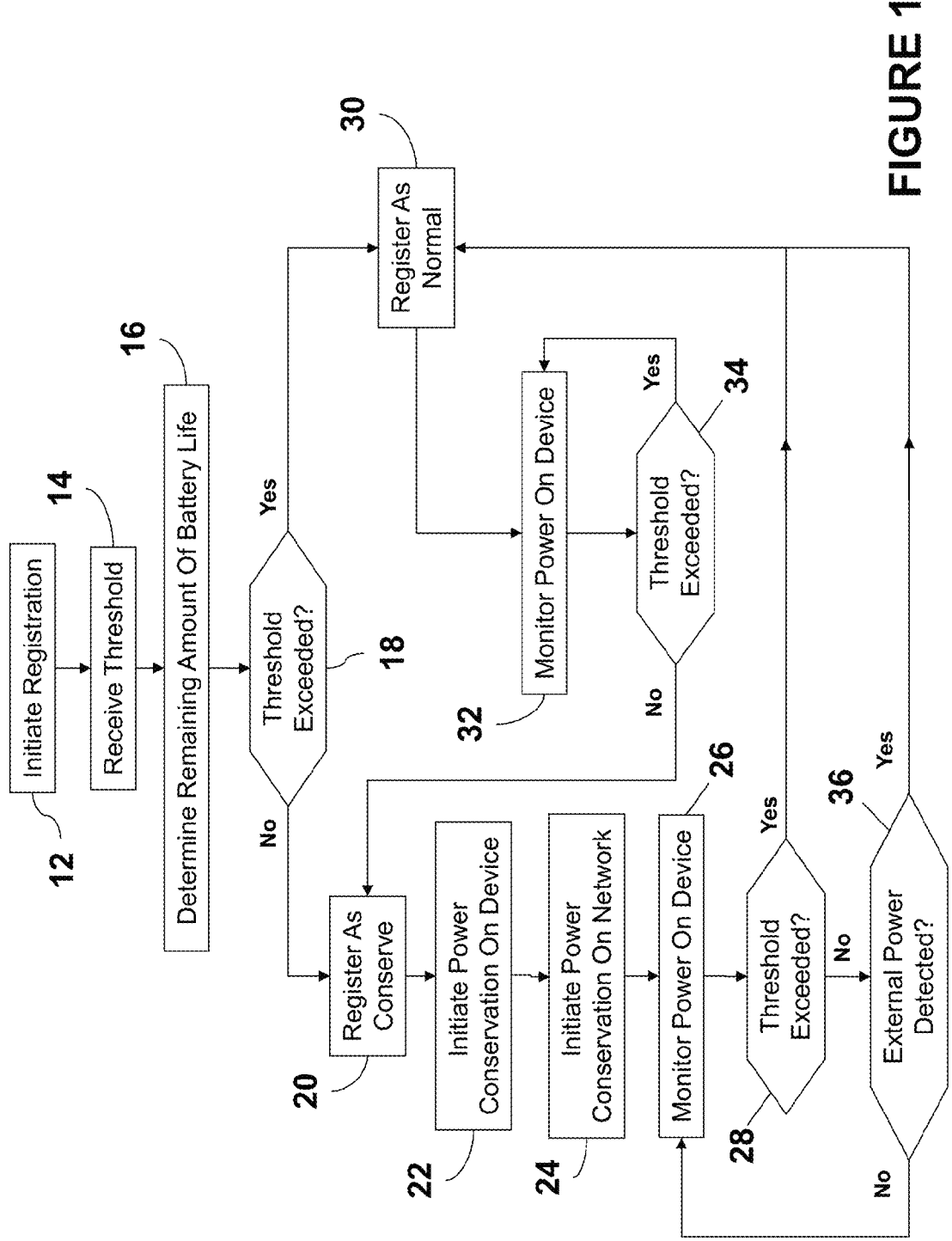
FIG. 1 is a flow diagram of an example process for collaborative power conscious utilization of a communications device in a communications network.

FIG. 1 is a flow diagram of an example process for collaborative power conscious utilization of a communications device in a communications network. A communications device, may initiate registration with a communications network at step 12. The communications device may receive a threshold at step 14. The communications device may receive the threshold during the process of the communications device attaching to the communications network. The threshold may comprise any appropriate threshold indicative of an amount of battery life. The threshold may comprise any appropriate threshold, such as, for example, a value, a percentage, or the like, or any appropriate combination thereof. The threshold may be in terms of any appropriate metric or measure. For example, the threshold may be in terms of time (e.g., minutes, seconds, hours, or fractions thereof), a percentage of total battery time, a percentage of total battery power, or the like, or any appropriate combination thereof. An indication of the threshold may be received from local storage on the communications device, an indication of the threshold may be received from the network, or any appropriate combination thereof. In an example embodiment the threshold may comprise a percentage of remaining battery life. Thus the threshold may be an indication of the remaining battery life needed for the communication device to operate in the normal mode rather than the conserve mode. In an example embodiment, the threshold may be variable. For example, if a communications device upgrades its battery from a 2 hours total battery life to a 4 hour total battery life, the threshold may be reduced from 50% to 25%. As another example, a network may adjust the threshold depending upon current and/or anticipated network conditions.

At step 16, the communications device may determine the remaining amount of battery life in the communications device. The remaining amount of battery life may be in terms of any appropriate metric or measure. For example, the remaining amount of battery life may be in terms of time (e.g., minutes, seconds, hours, or fractions thereof), a percentage of total battery time, a percentage of total battery power, or the like, or any appropriate combination thereof.

The communications device may determine if the remaining amount of battery life exceeds the threshold at step 18. This determination may be accomplished in any appropriate manner. For example, the communications device may have the ability to monitor battery usage and/or estimate remaining battery life. The communications device may compare the remaining battery life to the threshold to determine if the remaining amount of battery life exceeds the threshold. In an example embodiment, the communications device may convert metrics or measures in order to determine if the remaining amount of battery life exceeds the threshold. For example, the threshold may be in terms of a percentage of total battery life of the battery, and the communications device's battery monitoring mechanism may provide an indication of remaining battery life in terms of time. Thus, in this example scenario, the communications device may convert the threshold to time, convert the device's remaining battery life to a percentage of total battery life of the battery, or any appropriate combination thereof.

If it is determined at step 18 that the communications device's remaining battery life exceeds the threshold, the communications device may register with the network in the normal mode at step 30. Under the normal mode, the communications device may operate normally and work as per the RF environment that the network would normally treat a communications device. And, identifying itself as normal during the registration process, the communications device may follow standard paging, random access channel (RACH), and discontinuous reception (DRX) cycles, for example.

The communications device may monitor its remaining battery life at step 32. The communications device may monitor its remaining battery life in any appropriate manner. The communications device may monitor its remaining battery life continuously, periodically, aperiodically, randomly, pseudo randomly, as triggered by an appropriate event (e.g., triggered by user of the communications device, triggered by the network, triggered by the communications device, etc.), or the like, or any appropriate combination thereof.

The communications device may determine if the remaining amount of battery life exceeds the threshold at step 34. This determination may be accomplished in any appropriate manner. For example, the communications device may have the ability to monitor battery usage and/or estimate remaining battery life. The communications device may compare the remaining battery life to the threshold to determine if the remaining amount of battery life exceeds the threshold. In an example embodiment, the communications device may convert metrics or measures in order to determine if the remaining amount of battery life exceeds the threshold. For example, the threshold may be in terms of a percentage of total battery life of the battery, and the communications device's battery monitoring mechanism may provide an indication of remaining battery life in terms of time. Thus, in this example scenario, the communications device may convert the threshold to time, convert the device's remaining battery life to a percentage of total battery life of the battery, or any appropriate combination thereof.

If it is determined, at step 34, that the communications device's remaining battery life exceeds the threshold, the communications device may continue to monitor its remaining battery life at step 32. If it is determined, at step 34, that the communications device's remaining battery life does not exceed the threshold, the communications device may proceed to step 20 to reregister with the network in the conserve mode.

At step 18, if it is determined that the communications device's remaining battery life does not exceed the threshold, the communications device may proceed to step 20 to register with the network in the conserve mode. At step 22, as described in more detail below, power conservation may be initiated on the communications device. At step 24, as described in more detail below, power conservation may be initiated on the network.

The communications device may monitor its remaining battery life at step 26. The communications device may monitor its remaining battery life in any appropriate manner. The communications device may monitor its remaining battery life continuously, periodically, aperiodically, randomly, pseudo randomly, as triggered by an appropriate event (e.g., triggered by user of the communications device), or the like, or any appropriate combination thereof. This listing of claims will replace all prior versions, and listings, of claims in the application.

The communications device may determine if its remaining amount of battery life exceeds the threshold at step 28. This determination may be accomplished in any appropriate manner. For example, the communications device may have the ability to monitor battery usage and/or estimate remaining battery life. The communications device may compare the remaining battery life to the threshold to determine if the remaining amount of battery life exceeds the threshold. In an example embodiment, the communications device may convert metrics or measures in order to determine if the remaining amount of battery life exceeds the threshold. For example, the threshold may be in terms of a percentage of total battery life of the battery, and the communications device's battery monitoring mechanism may provide an indication of remaining battery life in terms of time. Thus, in this example scenario, the communications device may convert the threshold to time, convert the device's remaining battery life to a percentage of total battery life of the battery, or any appropriate combination thereof.

If it is determined, at step 28, that the communications device's remaining battery life exceeds the threshold, the communications device may reregister with the network in the normal mode at step 30.

If it is determined, at step 28, that the communications device's remaining battery life does not exceed the threshold, the communications device may monitor its state to determine if external power has been detected, at step 36. The communications device may determine that external power is detected for example, if the communications device is attached to an external charger, power source, or the like. If it is determined at step 36, that external power has not been detected, the communications device may continue to monitor its remaining battery power at step 26. If it is determined at step 36, that external power has been detected, the communications device may reregister in the normal mode at step 30.

In various example embodiments, when a communications device gets into low battery range (e.g., step 18, step 34, step 28), the communications device may send an indication to an entity of the communications network that it is running low on battery power. The entity may comprise any appropriate entity such as a base station, an Evolved Node B (also referred to as eNodeB or eNB), a Node B, a base transceiver station (also referred to as BTS), or the like, or any appropriate combination thereof. The communications device may register/reregister itself in a conserve mode. Network entities, such as schedulers, processors, applications, and/or other network elements may place the communications device in a designated, special category wherein the communications device may be subject to less interference and receive special treatment regarding paging, RACH, and/or power control. As a result, the communications device may transmit less, thus effectuating less power consumption to maintain its RF link.

Figure 2:
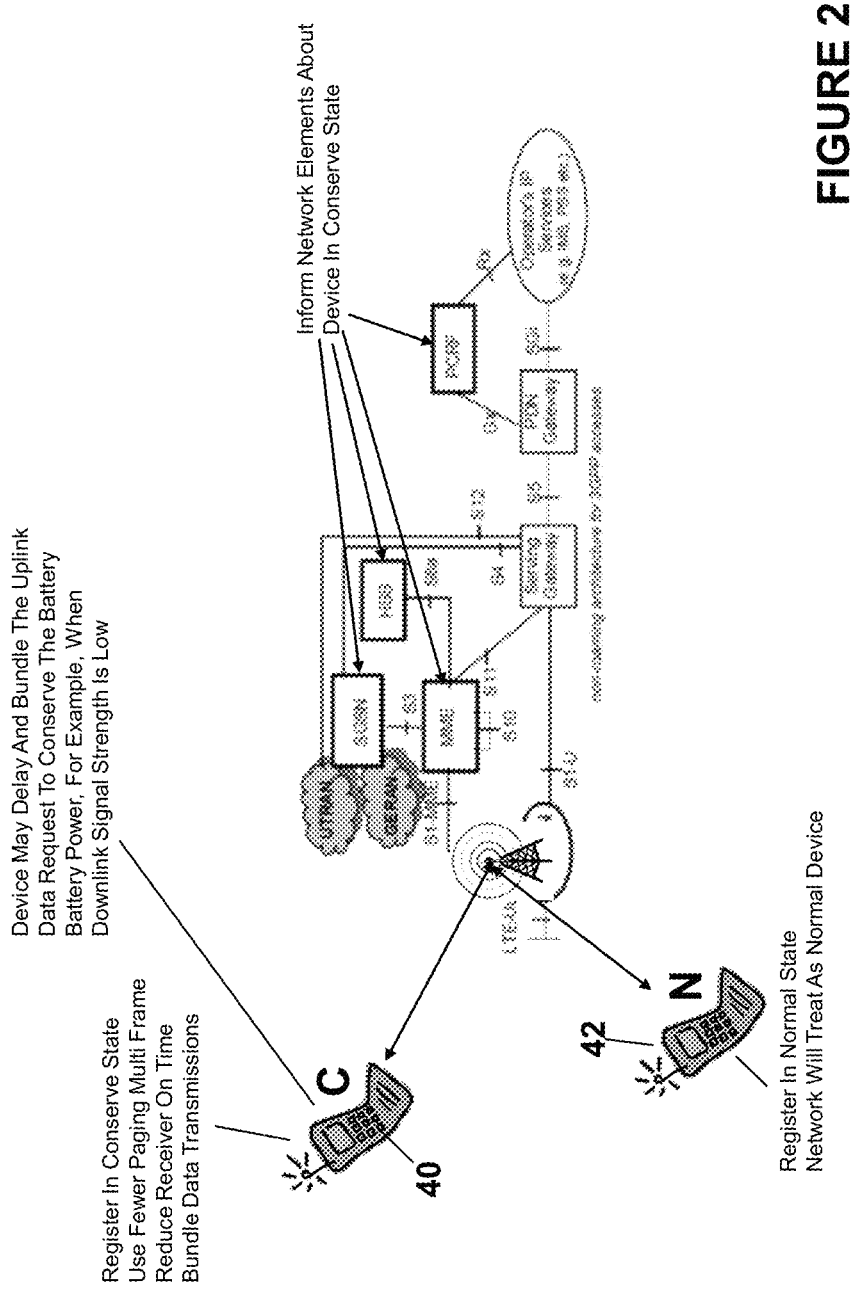
FIG. 2 is illustrates an example implementation of collaborative power conscious utilization of equipment in a communications network.

FIG. 2 is illustrates an example implementation of collaborative power conscious utilization of equipment in a communications network. As shown in FIG. 2, communications device 40 represents a communications device that registered in the conserve mode, as indicated by the letter "C", and communications device 44 represents s communications device that registered in the normal mode, as indicated by the letter "N". In an example embodiment, a network scheduler, for example, may allocate resource blocks with reduced interference to ensure that the communications device 40 consumes less power and thus conserves battery power. The communications device 40 and the network may bundle data before transmitting or receiving the data. Bundling may include, for example, accumulating data into larger amounts before transmitting. For example, if in the normal mode, data is packaged into n bytes and transmitted in n-byte chunks. In conserve mode data may be packaged into multiples of n bytes, and the multiple-n-byte package may be transferred. The multiple may comprise any integer multiplier greater than one or any fractional multiplier greater than one. Thus, for example, if n=1024, in normal mode, data may be transmitted in 1024-byte chunks. In conserve mode, if the multiplier is 2, data may be transmitted in 2048-byte chunks. And, in the conserve mode, if the multiplier is 1.5, data may be transmitted in 1536-byte chunks. This may reduce the number of transmissions from communications devices. For example the Maximum Transmission Unit (also referred to as MTU) size and data content in an MTU may be adjusted to reduce the processor load and/or power consumption. Thus, the communications device's battery life may be extended and a user of the communications device may use the communications device for longer periods of time per charge.

The herein described collaboration between a communications device and a network may apply to voice communication, nonvoice (e.g., data) communications, or any appropriate combination thereof.

The communications device 40 and/or the network may implement behavioral changes for voice communications implemented on any appropriate communications network. For example, when the communications network comprises a long term evolution (LTE) network, behavioral changes may apply when the communications device attaches to the LTE network regarding tracking are updates, location area updates, or any appropriate combination thereof. When the communications network comprises, for example, a universal mobile telecommunications system (UMTS) network, a global system for mobile communication (GSM) network, or any appropriate combination thereof, behavioral changes may apply when the communications device attaches to the UMTS and/or GSM network regarding a location area update. If the communications device 42 voice registered mode is normal, there may be no changes to existing behavior of the communications device and/or the communications network. If the communications device voice registered mode is conserve, the communications network may schedule incoming voice pages (e.g., for mobile terminated voice calls) over a subset of the paging multiframes used for communications device in the normal mode. The communications network also may schedule repeat pages and timeouts (e.g., for secondary treatment) over a longer interval.

The scheduling may be accomplished via any appropriate entity of the communications network. In an example embodiment, scheduling may be accomplished by and/or via a mobile switching center (MSC) of the communications network. The revised paging multiframe scheme may be exchanged between the MSC and communications device upon registration in the conserve mode. If the communications device voice registered mode is conserve, the communications device may reduce the number of paging multiframes it will monitor for incoming calls. The reduction in the number of paging multiframes to monitor may be provided by any appropriate entity, such as, for example, an MSC of the communications network, the communications device, or the like. In an example embodiment, an MSC of the communications network may provide an indication of the reduction of the number of paging multiframes to monitor during registration of the communications device with the network. The reduction of the number of paging multiframes to monitor may comprise any appropriate reduction. For example, the reduction may comprise a percentage reduction such as, for example, a 50% reduction, a 25% reduction, a 10%, reduction, or the like. With fewer paging multiframes to monitor, the communications device may disable its receiver for a higher percentage of time while idle. Thus, when the communications device in a conserve mode, its receiver may be disabled for a higher percentage of time than when the communications device is not in the conserve mode (e.g., normal mode). For example, the communications device may turn off (not supply) power to its receiver circuitry when not transmitting. This may reduce the receiver duty cycle time and battery draw while the communications device is in the idle state.

The communications device 40 and/or the network may implement behavioral changes for nonvoice (e.g., data)

communications implemented on any appropriate communications network. For example, when the communications network comprises a LTE network, behavioral changes may apply when the communications device attaches to the LTE network regarding tracking area updates, location area updates or any appropriate combination thereof. In the voice plus nonvoice (data) communications device case (e.g., smartphones), data registration may occur around the same time and under the same battery conditions as voice. Thus, the communications device registration for data and voice may match.

If the communications device 40 registers in the conserve mode, behavior may change in the communications device 40, the data network control plane, the data network user plane, or any appropriate combination thereof. If the communications device 40 data registered mode is conserve, the control plane network (e.g., SGSN, MME) may apply pages (e.g., for incoming data packets) to a subset of paging multiframes similar to that described for voice. Thus, the communications network may schedule incoming nonvoice pages (e.g., for mobile terminated voice calls) over a subset of the paging multiframes used for communications device in the normal mode. The communications network also may schedule repeat pages and timeouts (e.g., for secondary treatment) over a longer interval.

The scheduling may be accomplished via any appropriate entity of the communications network. In an example embodiment, scheduling may be accomplished by and/or via a serving GPRS support node (SGSN), a mobility management entity (MME), or any appropriate combination thereof. The revised paging multiframe scheme may be exchanged between the SGSN/MME and communications device upon registration in the conserve mode. If the communications device nonvoice (data), or voice and data, registered mode is conserve, the communications device may reduce the number of paging multiframes it will monitor for incoming traffic. The reduction in the number of paging multiframes to monitor may be provided by any appropriate entity, such as, for example, an SGSN, MME, the communications device, or the like. In an example embodiment, an SGSN and/or MME of the communications network may provide an indication of the reduction of the number of paging multiframes to monitor during registration of the communications device with the network. The reduction of the number of paging multiframes to monitor may comprise any appropriate reduction. For example, the reduction may comprise a percentage reduction such as, for example, a 50% reduction, a 25% reduction, a 10%, reduction, or the like. With fewer paging multiframes to monitor, the communications device may disable its receiver for a higher percentage of time while idle. Thus, when the communications device in a conserve mode, its receiver may be disabled for a higher percentage of time than when the communications device is not in the conserve mode (e.g., normal mode). For example, the communications device may turn off (not supply) power to its receiver circuitry when not transmitting. This may reduce the receiver duty cycle time and battery draw while the communications device is in the idle state.

The revised paging multiframe scheme may be exchanged between the SGSN, MME, and communications device upon registration in the conserve mode. In this case the voice plus data communications device may disable its receiver more often. For example, the communications device may turn off (not supply) power to its receiver circuitry when not transmitting. This may conserve battery power while idle in exchange for latency and delayed delivery of incoming packets until the battery is recharged. If the communications device data registered mode is conserve, the data user plane network (e.g., SGSN, signaling gateway (SGW), gateway general packet radio service service node (GGSN), packet data network gateway (PGW)) may be informed by the control plane network (e.g., SGSN, MME). In this case the data user plane network may bundle and delay network and/or server initiated initial incoming packet flows for the communications device. For example a new incoming packet flow (e.g., from a push service) may be delayed 30 seconds, and sent along with other incoming packets flows from other services trying to reach the communications device within the same time window. This may reduce the number of pages, associated state transitions, and/or battery draw for the communications device in exchange for latency and delayed delivery of incoming packets until the battery is recharged.

If the communications device 40 data registered mode is conserve, the communications device 40 also may take some data conservation measures on its own. These measures may be in addition to the reduced paging multiframes signaled by the network. In this case the communications device may monitor its downlink signal strength to ascertain path loss and predict relative communications device transmit power required to reach a cell site. More communications device power may be required for uplink data bursts when downlink signal strength is low. Thus, the communications device may bundle and/or delay uplink data requests to conserve battery power when downlink signal strength is low. This adjustment may be applied according to a scale. For example, this adjustment may apply a maximum bundling and delay for a low signal strength and may apply a minimum bundling and delay for a high signal strength. The communications device 40 also may disable bundling and delay if the pertinent data application is in the foreground with display on. therefore bundling only background data traffic. This may reduce the frequency of high-power transmit activity and/or associated battery usage for background applications in exchange for latency and delayed delivery of outgoing packets until the battery is recharged. The communications device may reregister in the normal mode and return to normal behavior if the battery charge increases above the threshold or the communications device detects it has been attached to an external charger and/or power source. In this case voice and data network may revert to normal behavior as well.

Figure 3:
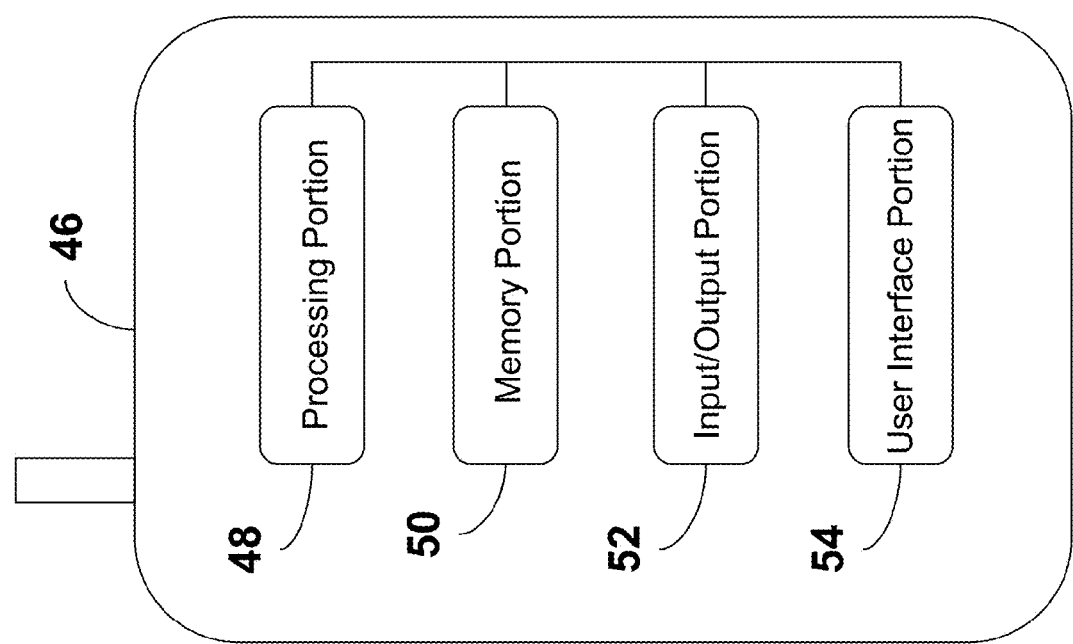
FIG. 3 is a block diagram of an example communications device (also referred to as a UE) 46 configured to facilitate collaborative power conscious utilization of equipment in a communications network.

FIG. 3 is a block diagram of an example communications device (also referred to as a UE) 46 configured to facilitate collaborative power conscious utilization of equipment in a communications network. In an example configuration, communications device 46 comprises a mobile wireless device. The communications device 46, however, may comprise any appropriate device, examples of which include a portable computing device, such as a laptop, a personal digital assistant ("PDA"), a portable phone (e.g., a cell phone or the like, a smart phone, a video phone), a portable email device, a portable gaming device, a TV, a DVD player, portable media player, (e.g., a portable music player, such as an MP3 player, a Walkman, etc.), a portable navigation device (e.g., GPS compatible device, A-GPS compatible device, etc.), or a combination thereof. The communications device 46 can include devices that are not typically thought of as portable, such as, for example, a public computing device, a navigation device installed in-vehicle, a set top box, or the like. The mobile communications device 46 can include non-conventional computing devices, such as, for example, a kitchen appliance, a motor vehicle control (e.g., steering wheel), etc., or the like. As evident from the herein description, a communications device is not to be construed as software per se.

The communications device 46 may include any appropriate device, mechanism, software, and/or hardware for facilitating use of collaborative power conscious utilization of equipment in a communications network as described herein. In an example embodiment, the ability to facilitate use of collaborative power conscious utilization of equipment in a communications network may be a feature of the communications device 46 that can be turned on and off. Thus, in an example embodiment, an owner of the communications device 46 may opt-in or opt-out of this capability.

In an example embodiment, the communications device 46 comprises a processor and memory coupled to the processor. The memory may comprise executable instructions that when executed by the processor cause the processor to effectuate operations associated with collaborative power conscious utilization of equipment in a communications network.

In an example configuration, the communications device 46 comprises a processing portion 48, a memory portion 50, an input/output portion 52, and a user interface (UI) portion 54. Each portion of the mobile communications device 46 comprises circuitry for performing functions associated with each respective portion. Thus, each portion can comprise hardware, or a combination of hardware and software. It is emphasized that the block diagram depiction of communications device 46 is exemplary and not intended to imply a specific implementation and/or configuration. For example, in an example configuration, the communications device 46 may comprise a cellular phone and the processing portion 48 and/or the memory portion 50 may be implemented, in part or in total, on a subscriber identity module (SIM) of the mobile communications device 46. In another example configuration, the communications device 46 may comprise a laptop computer. The laptop computer may include a SIM, and various portions of the processing portion 48 and/or the memory portion 50 can be implemented on the SIM, on the laptop other than the SIM, or any combination thereof.

The processing portion 48, memory portion 50, and input/output portion 52 may be coupled together to allow communications therebetween. In various embodiments, the input/output portion 52 may comprise a receiver of the communications device 46, a transmitter of the communications device 46, or a combination thereof. The input/output portion 52 may be capable of receiving and/or providing information pertaining to use of collaborative power conscious utilization of equipment in a communications network as described herein. In various configurations, the input/output portion 52 may receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof.

The processing portion 48 may be capable of performing functions pertaining to collaborative power conscious utilization of equipment in a communications network as described herein. In a basic configuration, the communications device 46 may include at least one memory portion 50. The memory portion 50 may comprise a storage medium having a tangible physical structure. Thus, the memory portion 50 is not to be construed as a transient signal per se. The memory portion 50 may store any information utilized in conjunction with collaborative power conscious utilization of equipment in a communications network as described herein. Depending upon the exact configuration and type of processor, the memory portion 50 may be volatile (such as some types of RAM), non-volatile (such as ROM, flash memory, etc.), or a combination thereof. The mobile communications device 46 may include additional storage (e.g., removable storage and/or non-removable storage) including, but not limited to, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the communications device 46.

The communications device 46 also may contain a user interface (UI) portion 54 allowing a user to communicate with the communications device 46. The UI portion 54 may be capable of rendering any information utilized in conjunction with collaborative power conscious utilization of equipment in a communications network as described herein. The UI portion 54 may provide the ability to control the communications device 46, via, for example, buttons, soft keys, voice actuated controls, a touch screen, movement of the mobile communications device 46, visual cues (e.g., moving a hand in front of a camera on the mobile communications device 46), or the like. The UI portion 54 may provide visual information (e.g., via a display), audio information (e.g., via speaker), mechanically (e.g., via a vibrating mechanism), or a combination thereof. In various configurations, the UI portion 54 may comprise a display, a touch screen, a keyboard, an accelerometer, a motion detector, a speaker, a microphone, a camera, a tilt sensor, or any combination thereof. The UI portion 54 may comprise means for inputting biometric information, such as, for example, fingerprint information, retinal information, voice information, and/or facial characteristic information.

The UI portion 54 may include a display for displaying multimedia such as, for example, application graphical user interfaces (GUIs), text, images, video, telephony functions such as Caller ID data, setup functions, menus, music, metadata, messages, wallpaper, graphics, Internet content, device status, preferences settings, map and location data, routes and other directions, points of interest (POI), and the like.

In some embodiments, the UI portion may comprise a user interface (UI) application. The UI application may interface with a client or operating system (OS) to, for example, facilitate user interaction with device functionality and data. The UI application may aid a user in entering message content, viewing received messages, answering/initiating calls, entering/deleting data, entering and setting user IDs and passwords, configuring settings, manipulating address book content and/or settings, interacting with other applications, or the like, and may aid the user in inputting selections and maneuvers associated with collaborative power conscious utilization of equipment in a communications network as described herein.

Figure 4:
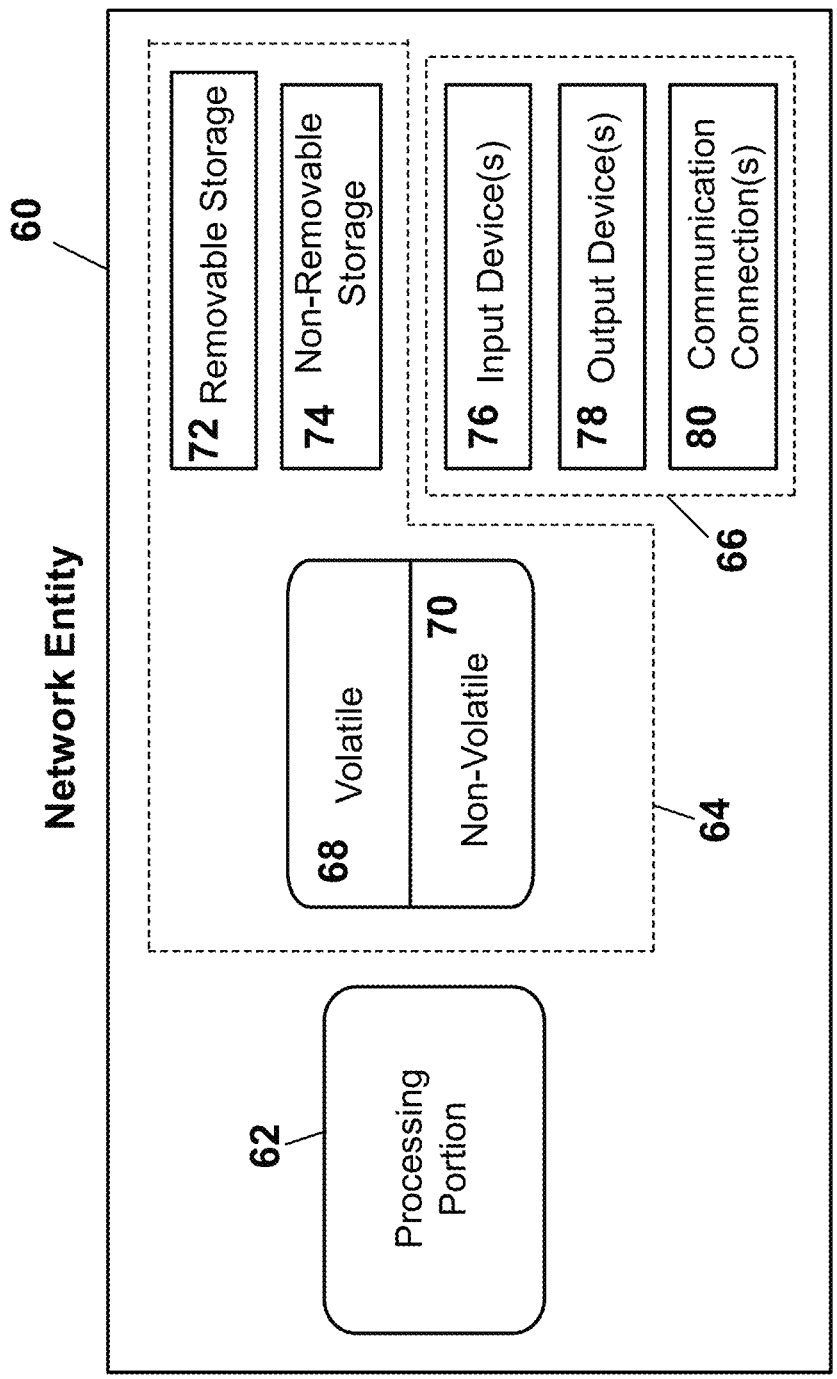
FIG. 4 is a block diagram of an example network entity 60 for facilitating collaborative power conscious utilization of equipment in a communications network.

FIG. 4 is a block diagram of an example network entity 60 for facilitating collaborative power conscious utilization of equipment in a communications network. The network entity 60 may comprise hardware or a combination of hardware and software. When used in conjunction with a network, the functionality needed to facilitating collaborative power conscious utilization of equipment in a communications network can reside in any one or combination of network entities. The network entity 60 depicted in FIG. 4 represents any appropriate network entity, or combination of network entities, such as a processor, a server, a gateway, a node, any appropriate entity depicted in FIG. 5, any appropriate entity depicted in FIG. 6, any appropriate entity depicted in FIG. 7, any appropriate entity depicted in FIG. 8, or any appropriate combination thereof. In an example configuration, the network entity 60 comprises a component or various components of a cellular broadcast system wireless network. It is emphasized that the block diagram depicted in FIG. 4 is exemplary and not intended to imply a specific implementation or configuration. Thus, the network entity 60 can be implemented in a single processor or multiple processors (e.g., single server or multiple servers, single gateway or multiple gateways, etc.). Multiple network entities can be distributed or centrally located. Multiple network entities can communicate wirelessly, via hard wire, or a combination thereof.

In an example embodiment, the network entity 60 comprises a processor and memory coupled to the processor. The memory may comprise executable instructions that when executed by the processor cause the processor to effectuate operations associated with collaborative power conscious utilization of equipment in a communications network.

In an example configuration, the network entity 60 comprises a processing portion 62, a memory portion 64, and an input/output portion 66. The processing portion 62, memory portion 64, and input/output portion 66 are coupled together (coupling not shown in FIG. 4) to allow communications therebetween. The input/output portion 66 is capable of receiving and/or providing information from/to a communications device and/or other network entities configured to be utilized with collaborative power conscious utilization of equipment in a communications network. For example, the input/output portion 66 can include a wireless communications (e.g., 2.5G/3G/4G/GPS) card. The input/output portion 66 may be capable of receiving and/or sending video information, audio information, control information, image information, data, or any combination thereof. In an example embodiment, the input/output portion 66 may be capable of receiving and/or sending information to determine a location of the network entity 60 and/or the communications device 30. In an example configuration, the input\output portion 66 may comprise a GPS receiver. In an example configuration, the network entity 60 may determine its own geographical location and/or the geographical location of a communications device through any type of location determination system including, for example, the Global Positioning System (GPS), assisted GPS (A-GPS), time difference of arrival calculations, configured constant location (in the case of non-moving devices), any combination thereof, or any other appropriate means. In various configurations, the input/output portion 66 can receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof. In an example configuration, the input/output portion comprises a WIFI finder, a two way GPS chipset or equivalent, or the like, or a combination thereof.

The processing portion 62 may be capable of performing functions associated with collaborative power conscious utilization of equipment in a communications network as described herein. That is, a communications device can perform functions internally (by the device) and/or utilize the network entity 60 to perform functions. For example, the processing portion 62 may be capable of, in conjunction with any other portion of the network entity 60, installing an application for collaborative power conscious utilization of equipment in a communications network, processing an application for collaborative power conscious utilization of equipment in a communications network, configuring the network entity 60 to function as a gateway for other devices to a network, determining the location at which to provide collaborative power conscious utilization of equipment in a communications network, determining the duration during which to provide collaborative power conscious utilization of equipment in a communications network, or the like, or any combination thereof. The processing portion 62, in conjunction with any other portion of the network entity 60, enables the network entity 60 to covert speech to text when it is configured to also send text messages while utilizing the event based service.

In a basic configuration, the network entity 60 may include at least one memory portion 64. The memory portion 64 may comprise a storage medium having a tangible physical structure. Thus, the memory portion 64 is not to be construed as a transient signal per se. The memory portion 64 may store any information utilized in conjunction with collaborative power conscious utilization of equipment in a communications network as described herein. Depending upon the exact configuration and type of processor, the memory portion 64 may be volatile 68 (such as some types of RAM), non-volatile 70 (such as ROM, flash memory, etc.), or a combination thereof. The mobile network entity 60 may include additional storage (e.g., removable storage 72 and/or non-removable storage 74) including, but not limited to, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the network entity 60.

The network entity 60 also may contain communications connection(s) 80 that allow the network entity 60 to communicate with other devices, network entities, or the like. A communications connection(s) can comprise communication media. Communication media typically embody computer readable instructions, data structures, program modules or other data in a modulated data signal such as a carrier wave or other transport mechanism and includes any information delivery media. By way of example, and not limitation, communication media include wired media such as a wired network or direct-wired connection, and wireless media such as acoustic, RF, infrared, and other wireless media. The term computer readable media as used herein includes both storage media and communication media. The network entity 60 also can include input device(s) 76 such as keyboard, mouse, pen, voice input device, touch input device, etc. Output device(s) 78 such as a display, speakers, printer, etc. also can be included.

A communications device can be part of and/or in communications with various wireless communications networks. Some of which are described below.

Figure 5:
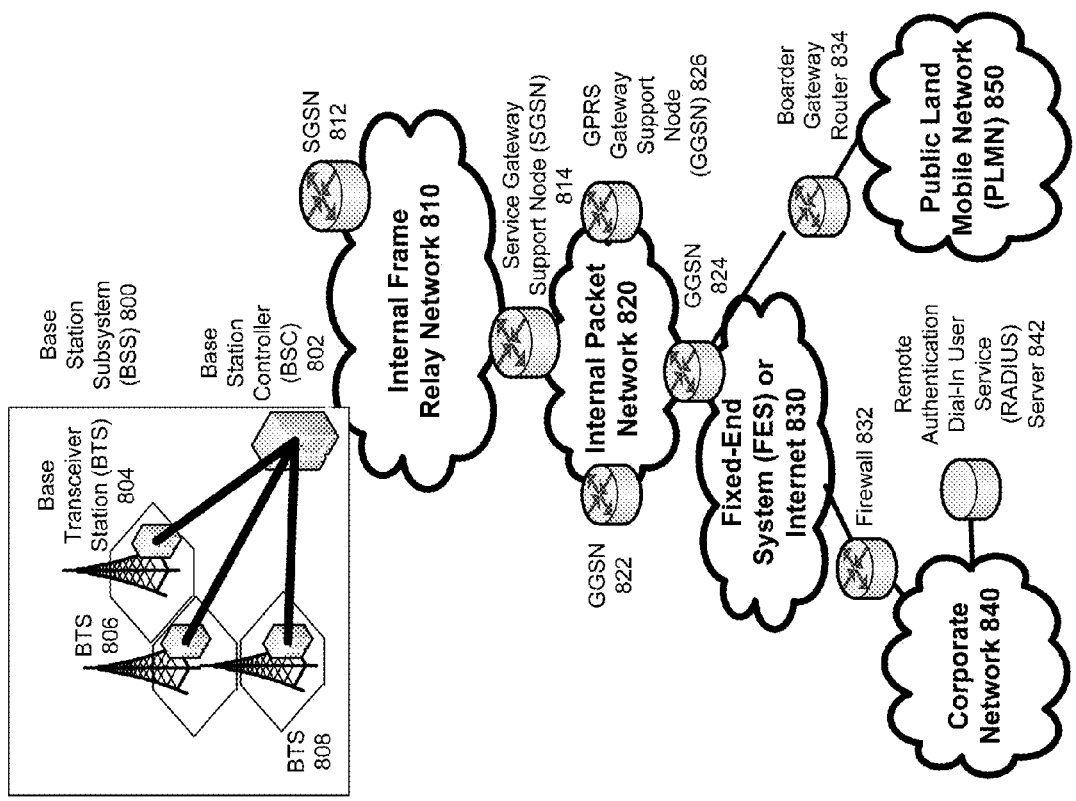
FIG. 5 depicts an overall block diagram of an example packet-based mobile cellular network environment, such as a GPRS network, within which collaborative power conscious utilization of equipment in a communications network may be implemented.

FIG. 5 depicts an overall block diagram of an example packet-based mobile cellular network environment, such as a GPRS network, within which collaborative power conscious utilization of equipment in a communications network may be implemented. In the example packet-based mobile cellular network environment shown in FIG. 5, there are a plurality of Base Station Subsystems ("BSS") 800 (only one is shown), each of which comprises a Base Station Controller ("BSC") 802 serving a plurality of Base Transceiver Stations ("BTS") such as BTSs 804, 806, and 808. BTSs 804, 806, 808, etc. are the access points where users of packet-based mobile devices become connected to the wireless network. In example fashion, the packet traffic originating from user devices is transported via an over-the-air interface to a BTS 808, and from the BTS 808 to the BSC 802. Base station subsystems, such as BSS 800, are a part of internal frame relay network 810 that can include Service GPRS Support Nodes ("SGSN") such as SGSN 812 and 814. Each SGSN is connected to an internal packet network 820 through which a SGSN 812, 814, etc. can route data packets to and from a plurality of gateway GPRS support nodes (GGSN) 822, 824, 826, etc. As illustrated, SGSN 814 and GGSNs 822, 824, and 826 are part of internal packet network 820. Gateway GPRS serving nodes 822, 824 and 826 mainly provide an interface to external Internet Protocol ("IP") networks such as Public Land Mobile Network ("PLMN") 850, corporate intranets 840, or Fixed-End System ("FES") or the public Internet 830. As illustrated, subscriber corporate network 840 may be connected to GGSN 824 via firewall 832; and PLMN 850 is connected to GGSN 824 via boarder gateway router 834. The Remote Authentication Dial-In User Service ("RADIUS") server 842 may be used for caller authentication when a user of a mobile cellular device calls corporate network 840.

Generally, there can be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 6:
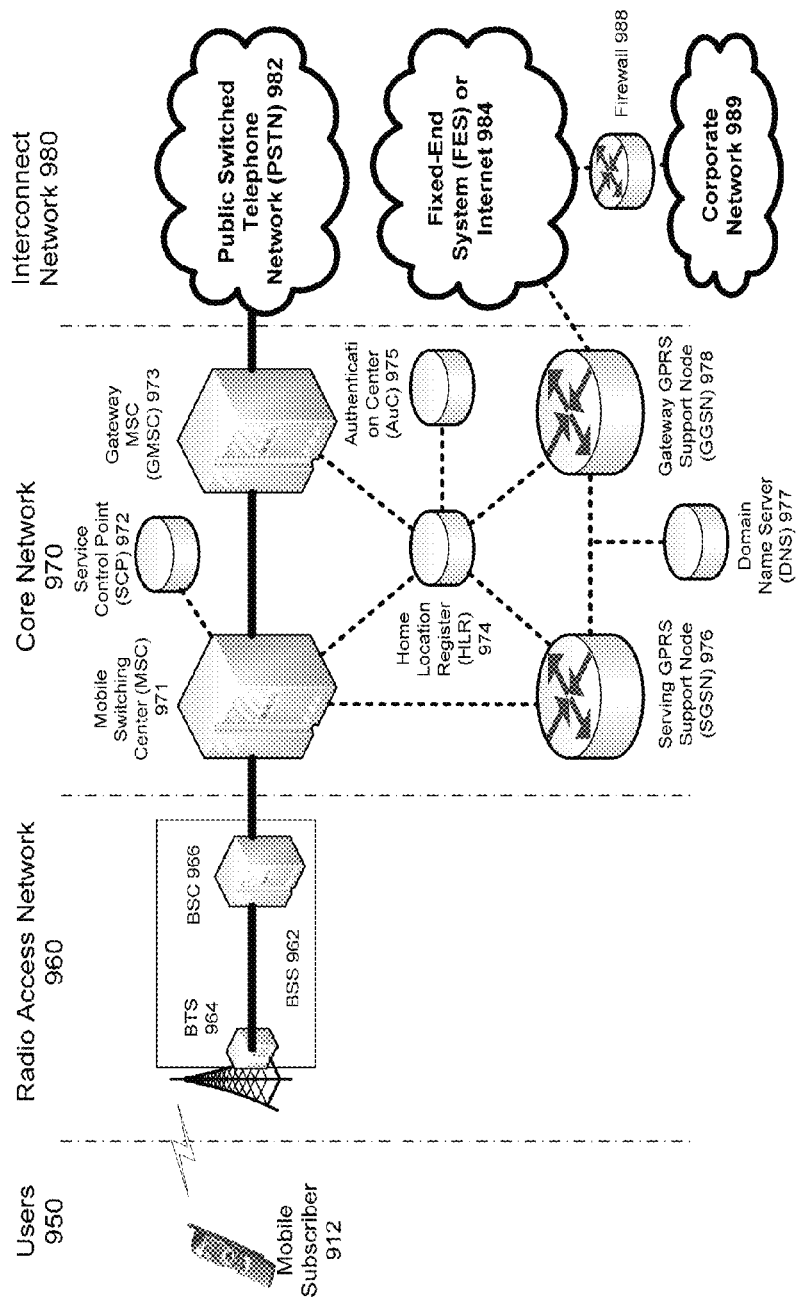
FIG. 6 illustrates an architecture of a typical GPRS network within which collaborative power conscious utilization of equipment in a communications network may be implemented.

FIG. 6 illustrates an architecture of a typical GPRS network within which collaborative power conscious utilization of equipment in a communications network may be implemented. The architecture depicted in FIG. 6 is segmented into four groups: users 950, radio access network 960, core network 970, and interconnect network 980. Users 950 comprise a plurality of end users. Note device 912 is referred to as a mobile subscriber in the description of network shown in FIG. 6. In an example embodiment, the device depicted as mobile subscriber 912 comprises a communications device (e.g., communications device 46). Radio access network 960 comprises a plurality of base station subsystems such as BSSs 962, which include BTSs 964 and BSCs 966. Core network 970 comprises a host of various network elements. As illustrated in FIG. 6, core network 970 may comprise Mobile Switching Center ("MSC") 971, Service Control Point ("SCP") 972, gateway MSC 973, SGSN 976, Home Location Register ("HLR") 974, Authentication Center ("AuC") 975, Domain Name Server ("DNS") 977, and GGSN 978. Interconnect network 980 also comprises a host of various networks and other network elements. As illustrated in FIG. 6, interconnect network 980 comprises Public Switched Telephone Network ("PSTN") 982, Fixed-End System ("FES") or Internet 984, firewall 988, and Corporate Network 989.

A mobile switching center can be connected to a large number of base station controllers. At MSC 971, for instance, depending on the type of traffic, the traffic may be separated in that voice may be sent to Public Switched Telephone Network ("PSTN") 982 through Gateway MSC ("GMSC") 973, and/or data may be sent to SGSN 976, which then sends the data traffic to GGSN 978 for further forwarding.

When MSC 971 receives call traffic, for example, from BSC 966, it sends a query to a database hosted by SCP 972. The SCP 972 processes the request and issues a response to MSC 971 so that it may continue call processing as appropriate.

The HLR 974 is a centralized database for users to register to the GPRS network. HLR 974 stores static information about the subscribers such as the International Mobile Subscriber Identity ("IMSI"), subscribed services, and a key for authenticating the subscriber. HLR 974 also stores dynamic subscriber information such as the current location of the mobile subscriber. Associated with HLR 974 is AuC 975. AuC 975 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 6, when mobile subscriber 912 initiates the attach process by turning on the network capabilities of the mobile device, an attach request is sent by mobile subscriber 912 to SGSN 976. The SGSN 976 queries another SGSN, to which mobile subscriber 912 was attached before, for the identity of mobile subscriber 912. Upon receiving the identity of mobile subscriber 912 from the other SGSN, SGSN 976 requests more information from mobile subscriber 912. This information is used to authenticate mobile subscriber 912 to SGSN 976 by HLR 974. Once verified, SGSN 976 sends a location update to HLR 974 indicating the change of location to a new SGSN, in this case SGSN 976. HLR 974 notifies the old SGSN, to which mobile subscriber 912 was attached before, to cancel the location process for mobile subscriber 912. HLR 974 then notifies SGSN 976 that the location update has been performed. At this time, SGSN 976 sends an Attach Accept message to mobile subscriber 912, which in turn sends an Attach Complete message to SGSN 976.

After attaching itself with the network, mobile subscriber 912 then goes through the authentication process. In the authentication process, SGSN 976 sends the authentication information to HLR 974, which sends information back to SGSN 976 based on the user profile that was part of the user's initial setup. The SGSN 976 then sends a request for authentication and ciphering to mobile subscriber 912. The mobile subscriber 912 uses an algorithm to send the user identification (ID) and password to SGSN 976. The SGSN 976 uses the same algorithm and compares the result. If a match occurs, SGSN 976 authenticates mobile subscriber 912.

Next, the mobile subscriber 912 establishes a user session with the destination network, corporate network 989, by going through a Packet Data Protocol ("PDP") activation process. Briefly, in the process, mobile subscriber 912 requests access to the Access Point Name ("APN"), for example, UPS.com, and SGSN 976 receives the activation request from mobile subscriber 912. SGSN 976 then initiates a Domain Name Service ("DNS") query to learn which GGSN node has access to the UPS.com APN. The DNS query is sent to the DNS server within the core network 970, such as DNS 977, which is provisioned to map to one or more GGSN nodes in the core network 970. Based on the APN, the mapped GGSN 978 can access the requested corporate network 989. The SGSN 976 then sends to GGSN 978 a Create Packet Data Protocol ("PDP") Context Request message that contains necessary information. The GGSN 978 sends a Create PDP Context Response message to SGSN 976, which then sends an Activate PDP Context Accept message to mobile subscriber 912.

Once activated, data packets of the call made by mobile subscriber 912 can then go through radio access network 960, core network 970, and interconnect network 980, in a particular fixed-end system or Internet 984 and firewall 988, to reach corporate network 989.

Figure 7:
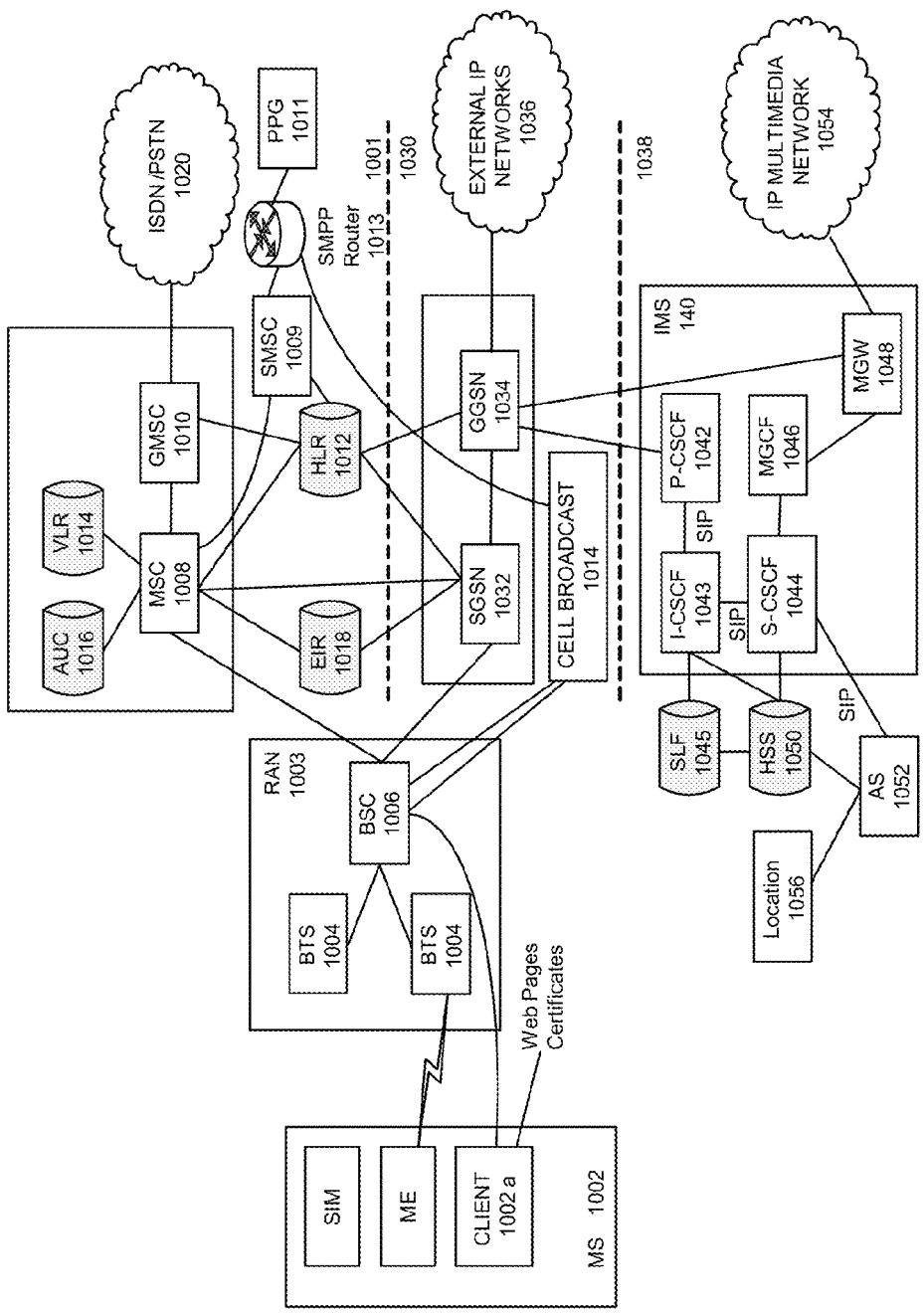
FIG. 7 illustrates an example block diagram view of a GSM/GPRS/IP multimedia network architecture within which collaborative power conscious utilization of equipment in a communications network may be implemented.

FIG. 7 illustrates an example block diagram view of a GSM/GPRS/IP multimedia network architecture within which collaborative power conscious utilization of equipment in a communications network may be implemented. As illustrated, the architecture of FIG. 7 includes a GSM core network 1001, a GPRS network 1030 and an IP multimedia network 1038. The GSM core network 1001 includes a Mobile Station (MS) 1002, at least one Base Transceiver Station (BTS) 1004 and a Base Station Controller (BSC) 1006. The MS 1002 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 1004 is physical equipment, such as a radio tower, that enables a radio interface to communicate with the MS. Each BTS may serve more than one MS. The BSC 1006 manages radio resources, including the BTS. The BSC may be connected to several BTSs. The BSC and BTS components, in combination, are generally referred to as a base station (BSS) or radio access network (RAN) 1003.

The GSM core network 1001 also includes a Mobile Switching Center (MSC) 1008, a Gateway Mobile Switching Center (GMSC) 1010, a Home Location Register (HLR) 1012, Visitor Location Register (VLR) 1014, an Authentication Center (AuC) 1018, and an Equipment Identity Register (EIR) 1016. The MSC 1008 performs a switching function for the network. The MSC also performs other functions, such as registration, authentication, location updating, handovers, and call routing. The GMSC 1010 provides a gateway between the GSM network and other networks, such as an Integrated Services Digital Network (ISDN) or Public Switched Telephone Networks (PSTNs) 1020. Thus, the GMSC 1010 provides interworking functionality with external networks.

The HLR 1012 is a database that contains administrative information regarding each subscriber registered in a corresponding GSM network. The HLR 1012 also contains the current location of each MS. The VLR 1014 is a database that contains selected administrative information from the HLR 1012. The VLR contains information necessary for call control and provision of subscribed services for each MS currently located in a geographical area controlled by the VLR. The HLR 1012 and the VLR 1014, together with the MSC 1008, provide the call routing and roaming capabilities of GSM. The AuC 1016 provides the parameters needed for authentication and encryption functions. Such parameters allow verification of a subscriber's identity. The EIR 1018 stores security-sensitive information about the mobile equipment.

A Short Message Service Center (SMSC) 1009 allows one-to-one Short Message Service (SMS) messages to be sent to/from the MS 1002. A Push Proxy Gateway (PPG) 1011 is used to "push" (i.e., send without a synchronous request) content to the MS 1002. The PPG 1011 acts as a proxy between wired and wireless networks to facilitate pushing of data to the MS 1002. A Short Message Peer to Peer (SMPP) protocol router 1013 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1002 sends a location update including its current location information to the MSC/VLR, via the BTS 1004 and the BSC 1006. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1030 is logically implemented on the GSM core network architecture by introducing two packet-switching network nodes, a serving GPRS support node (SGSN) 1032, a cell broadcast and a Gateway GPRS support node (GGSN) 1034. The SGSN 1032 is at the same hierarchical level as the MSC 1008 in the GSM network. The SGSN controls the connection between the GPRS network and the MS 1002. The SGSN also keeps track of individual MS's locations and security functions and access controls.

A Cell Broadcast Center (CBC) 14 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1034 provides a gateway between the GPRS network and a public packet network (PDN) or other IP networks 1036. That is, the GGSN provides interworking functionality with external networks, and sets up a logical link to the MS through the SGSN. When packet-switched data leaves the GPRS network, it is transferred to an external TCP-IP network 1036, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1030 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while received data and vice versa.

The IP multimedia network 1038 was introduced with 3GPP Release 5, and includes an IP multimedia subsystem (IMS) 1040 to provide rich multimedia services to end users. A representative set of the network entities within the IMS 1040 are a call/session control function (CSCF), a media gateway control function (MGCF) 1046, a media gateway (MGW) 1048, and a master subscriber database, called a home subscriber server (HSS) 1050. The HSS 1050 may be common to the GSM network 1001, the GPRS network 1030 as well as the IP multimedia network 1038.

The IP multimedia system 1040 is built around the call/session control function, of which there are three types: an interrogating CSCF (I-CSCF) 1043, a proxy CSCF (P-CSCF) 1042, and a serving CSCF (S-CSCF) 1044. The P-CSCF 1042 is the MS's first point of contact with the IMS 1040. The P-CSCF 1042 forwards session initiation protocol (SIP) messages received from the MS to an SIP server in a home network (and vice versa) of the MS. The P-CSCF 1042 may also modify an outgoing request according to a set of rules defined by the network operator (for example, address analysis and potential modification).

The I-CSCF 1043, forms an entrance to a home network and hides the inner topology of the home network from other networks and provides flexibility for selecting an S-CSCF. The I-CSCF 1043 may contact a subscriber location function (SLF) 1045 to determine which HSS 1050 to use for the particular subscriber, if multiple HSS's 1050 are present. The S-CSCF 1044 performs the session control services for the MS 1002. This includes routing originating sessions to external networks and routing terminating sessions to visited networks. The S-CSCF 1044 also decides whether an application server (AS) 1052 is required to receive information on an incoming SIP session request to ensure appropriate service handling. This decision is based on information received from the HSS 1050 (or other sources, such as an application server 1052). The AS 1052 also communicates to a location server 1056 (e.g., a Gateway Mobile Location Center (GMLC)) that provides a position (e.g., latitude/longitude coordinates) of the MS 1002.

The HSS 1050 contains a subscriber profile and keeps track of which core network node is currently handling the subscriber. It also supports subscriber authentication and authorization functions (AAA). In networks with more than one HSS 1050, a subscriber location function provides information on the HSS 1050 that contains the profile of a given subscriber.

The MGCF 1046 provides interworking functionality between SIP session control signaling from the IMS 1040 and ISUP/BICC call control signaling from the external GSTN networks (not shown). It also controls the media gateway (MGW) 1048 that provides user-plane interworking functionality (e.g., converting between AMR- and PCM-coded voice). The MGW 1048 also communicates with other IP multimedia networks 1054.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

Figure 8:
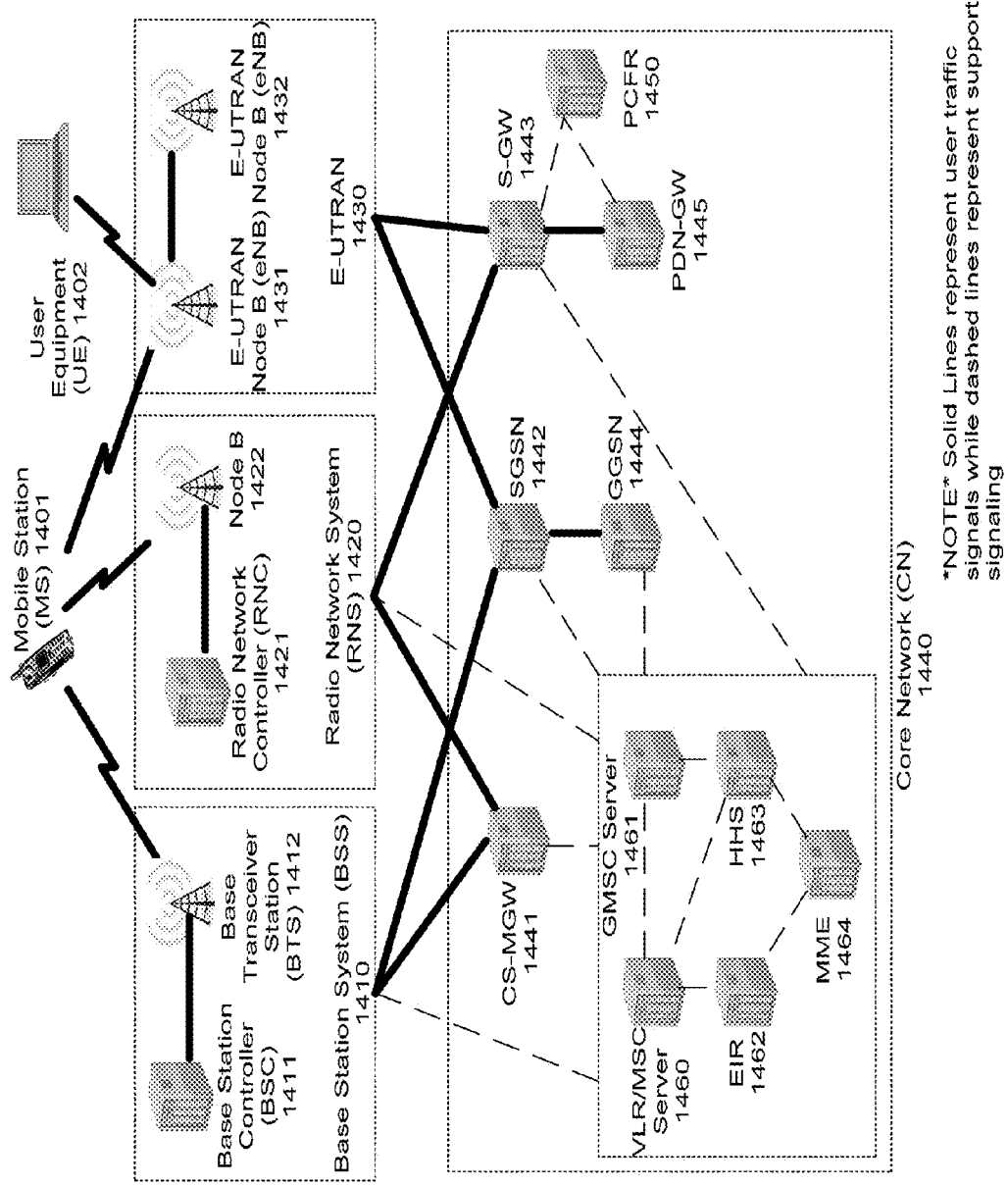
FIG. 8 illustrates a PLMN block diagram view of an example architecture in which collaborative power conscious utilization of equipment in a communications network may be incorporated.

FIG. 8 illustrates a PLMN block diagram view of an example architecture in which collaborative power conscious utilization of equipment in a communications network may be incorporated. Mobile Station (MS) 1401 is the physical equipment used by the PLMN subscriber. In one illustrative embodiment, communications device 200 may serve as Mobile Station 1401. Mobile Station 1401 may be one of, but not limited to, a cellular telephone, a cellular telephone in combination with another electronic device or any other wireless mobile communication device.

Mobile Station 1401 may communicate wirelessly with Base Station System (BSS) 1410. BSS 1410 contains a Base Station Controller (BSC) 1411 and a Base Transceiver Station (BTS) 1412. BSS 1410 may include a single BSC 1411/BTS 1412 pair (Base Station) or a system of BSC/BTS pairs which are part of a larger network. BSS 1410 is responsible for communicating with Mobile Station 1401 and may support one or more cells. BSS 1410 is responsible for handling cellular traffic and signaling between Mobile Station 1401 and Core Network 1440. Typically, BSS 1410 performs functions that include, but are not limited to, digital conversion of speech channels, allocation of channels to mobile devices, paging, and transmission/reception of cellular signals.

Additionally, Mobile Station 1401 may communicate wirelessly with Radio Network System (RNS) 1420. RNS 1420 contains a Radio Network Controller (RNC) 1421 and one or more Node(s) B 1422. RNS 1420 may support one or more cells. RNS 1420 may also include one or more RNC 1421/Node B 1422 pairs or alternatively a single RNC 1421 may manage multiple Nodes B 1422. RNS 1420 is responsible for communicating with Mobile Station 1401 in its geographically defined area. RNC 1421 is responsible for controlling the Node(s) B 1422 that are connected to it and is a control element in a UMTS radio access network. RNC 1421 performs functions such as, but not limited to, load control, packet scheduling, handover control, security functions, as well as controlling Mobile Station 1401's access to the Core Network (CN) 1440.

The evolved UMTS Terrestrial Radio Access Network (E-UTRAN) 1430 is a radio access network that provides wireless data communications for Mobile Station 1401 and User Equipment 1402. E-UTRAN 1430 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 1430 may include of series of logical network components such as E-UTRAN Node B (eNB) 1431 and E-UTRAN Node B (eNB) 1432. E-UTRAN 1430 may contain one or more eNBs. User Equipment 1402 may be any user device capable of connecting to E-UTRAN 1430 including, but not limited to, a personal computer, laptop, mobile device, wireless router, or other device capable of wireless connectivity to E-UTRAN 1430. The improved performance of the E-UTRAN 1430 relative to a typical UMTS network allows for increased bandwidth, spectral efficiency, and functionality including, but not limited to, voice, high-speed applications, large data transfer and IPTV, while still allowing for full mobility.

An example embodiment of a mobile data and communication service that may be implemented in the PLMN architecture described in FIG. 8 is the Enhanced Data rates for GSM Evolution (EDGE). EDGE is an enhancement for GPRS networks that implements an improved signal modulation scheme known as 8-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1401 may communicate with any or all of BSS 1410, RNS 1420, or E-UTRAN 1430. In a illustrative system, each of BSS 1410, RNS 1420, and E-UTRAN 1430 may provide Mobile Station 1401 with access to Core Network 1440. The Core Network 1440 may include of a series of devices that route data and communications between end users. Core Network 1440 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched-Media Gateway Function (CS-MGW) 1441 is part of Core Network 1440, and interacts with Visitor Location Register (VLR) and Mobile-Services Switching Center (MSC) Server 1460 and Gateway MSC Server 1461 in order to facilitate Core Network 1440 resource control in the CS domain. Functions of CS-MGW 1441 include, but are not limited to, media conversion, bearer control, payload processing and other mobile network processing such as handover or anchoring. CS-MGW 1440 may receive connections to Mobile Station 1401 through BSS 1410, RNS 1420 or both.

Serving GPRS Support Node (SGSN) 1442 stores subscriber data regarding Mobile Station 1401 in order to facilitate network functionality. SGSN 1442 may store subscription information such as, but not limited to, the International Mobile Subscriber Identity (IMSI), temporary identities, or Packet Data Protocol (PDP) addresses. SGSN 1442 may also store location information such as, but not limited to, the Gateway GPRS Support Node (GGSN) 1444 address for each GGSN where an active PDP exists. GGSN 1444 may implement a location register function to store subscriber data it receives from SGSN 1442 such as subscription or location information.

Serving Gateway (S-GW) 1443 is an interface which provides connectivity between E-UTRAN 1430 and Core Network 1440. Functions of S-GW 1443 include, but are not limited to, packet routing, packet forwarding, transport level packet processing, event reporting to Policy and Charging Rules Function (PCRF) 1450, and mobility anchoring for inter-network mobility. PCRF 1450 uses information gathered from S-GW 1443, as well as other sources, to make applicable policy and charging decisions related to data flows, network resources and other network administration functions. Packet Data Network Gateway (PDN-GW) 1445 may provide user-to-services connectivity functionality including, but not limited to, network-wide mobility anchoring, bearer session anchoring and control, and IP address allocation for PS domain connections.

Home Subscriber Server (HSS) 1463 is a database for user information, and stores subscription data regarding Mobile Station 1401 or User Equipment 1402 for handling calls or data sessions. Networks may contain one HSS 1463 or more if additional resources are required. Example data stored by HSS 1463 include, but is not limited to, user identification, numbering and addressing information, security information, or location information. HSS 1463 may also provide call or session establishment procedures in both the PS and CS domains.

The VLR/MSC Server 1460 provides user location functionality. When Mobile Station 1401 enters a new network location, it begins a registration procedure. A MSC Server for that location transfers the location information to the VLR for the area. A VLR and MSC Server may be located in the same computing environment, as is shown by VLR/MSC Server 1460, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1401 registration or procedures for handover of Mobile Station 1401 to a different section of the Core Network 1440. GMSC Server 1461 may serve as a connection to alternate GMSC Servers for other mobile stations in larger networks.

Equipment Identity Register (EIR) 1462 is a logical element which may store the International Mobile Equipment Identities (IMEI) for Mobile Station 1401. In a typical embodiment, user equipment may be classified as either "white listed" or "black listed" depending on its status in the network. In one embodiment, if Mobile Station 1401 is stolen and put to use by an unauthorized user, it may be registered as "black listed" in EIR 1462, preventing its use on the network. Mobility Management Entity (MME) 1464 is a control node which may track Mobile Station 1401 or User Equipment 1402 if the devices are idle. Additional functionality may include the ability of MME 1464 to contact an idle Mobile Station 1401 or User Equipment 1402 if retransmission of a previous session is required.

While example embodiments of collaborative power conscious utilization of equipment in a communications network have been described in connection with various computing devices/processors, the underlying concepts may be applied to any computing device, processor, or system capable of implementing collaborative power conscious utilization of equipment in a communications network. The various techniques described herein may be implemented in connection with hardware, or hardware and software. Thus, the methods and apparatuses of using and implementing collaborative power conscious utilization of equipment in a communications network may be implemented, or certain aspects or portions thereof, may take the form of program code (i.e., instructions) embodied in tangible storage media having a tangible physical structure. Examples of tangible storage media include floppy diskettes, CD-ROMs, DVDs, hard drives, or any other tangible machine-readable storage medium (computer-readable storage medium). Thus, a computer-readable storage medium is not to be construed as a transient signal per se. When the program code is loaded into and executed by a machine, such as a computer, the machine becomes an apparatus for implementing collaborative power conscious utilization of equipment in a communications network. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for collaborative power conscious utilization of equipment in a communications network also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for facilitating collaborative power conscious utilization of equipment in a communications network. When implemented on a general-purpose processor, the program code combines with the processor to provide a unique apparatus that operates to invoke the functionality of collaborative power conscious utilization of equipment in a communications network.

While collaborative power conscious utilization of equipment in a communications network has been described in connection with the various embodiments of the various figures, it is to be understood that other similar embodiments can be used or modifications and additions can be made to the described embodiments for collaborative power conscious utilization of equipment in a communications network without deviating therefrom. For example, one skilled in the art will recognize that collaborative power conscious utilization of equipment in a communications network as described in the present application may apply to any environment, whether wired or wireless, and may be applied to any number of such devices connected via a communications network and interacting across the network. Therefore, collaborative power conscious utilization of equipment in a communications network should not be limited to any single embodiment, but rather should be construed in breadth and scope in accordance with the appended claims.

What is claimed:

1. A network entity comprising:
   a processor; and
   memory coupled to the processor, the memory comprising executable instructions that when executed by the processor cause the network entity to effectuate operations comprising:
   receiving request for registration of a communications device in a conserve mode;
   engaging in registration with the communications device;
   based on the conserve mode of the communications device, initiating at least one power conservation mechanism on an entity other than the communications device in a network;
   causing power to be conserved on the communications device as long as the communications device operates within the network by having the entity implement the at least one power conservation mechanism; and
   providing an indication that the at least one power conservation mechanism was implemented, wherein an intended recipient of the indication is the communications device,
   wherein the network comprises at least one of a long term evolution network, a universal mobile telecommunications system network, or a global system for mobile communication network.

2. The network entity of claim 1, the operations further comprising:
   providing an indication of a threshold, wherein an intended recipient of the provided threshold is the communications device.

3. The network entity of claim 1, the at least one power conservation mechanism comprising:
   adjusting a random access channel paging cycle.

4. The network entity of claim 1, the at least one power conservation mechanism comprising:
   adjusting a discontinuous reception paging cycle.

5. The network entity of claim 1, the at least one power conservation mechanism comprising:
   bundling data for transmission to the communications device.

6. The network entity of claim 1, the at least one power conservation mechanism comprising:
   adjusting a maximum transfer unit size for data to be transmitted.

7. The network entity of claim 1, wherein:
   the communications device is configurable to implement at least one conservation mechanism on the communications device, wherein the
   at least one conservation mechanism and the at least one power conservation mechanism collaborate to conserve power on the communications device.

8. A communications device comprising:
   a processor; and
   memory coupled to the processor, the memory comprising executable instructions that cause the processor executing the executable instructions to effectuate operations comprising:
   providing a request for registration in a conserve mode;
   engaging in registration with an entity in a network; and
   receiving an indication of at least one power conservation mechanism implemented by the entity based on the conserve mode of the communications device;
   conserving power as long as the communications device operates within the network as a result of the at least one power conservation mechanism being implemented by the entity,
   wherein the network comprises at least one of a long term evolution network, a universal mobile telecommunications system network, or a global system for mobile communication network.

9. The communications device of claim 8, the operations further comprising:
  receiving an indication of a threshold; and
  comparing a remaining amount of power on the communications device with the threshold;
  wherein providing the indication of registration in the conserve mode comprises providing the indication if the remaining amount of power is less than the threshold.

10. The communications device of claim 8, the at least one power conservation mechanism implemented on the entity comprising:
  adjusting a random access channel paging cycle.

11. The communications device of claim 8, the at least one power conservation mechanism implemented on the entity comprising:
  adjusting a discontinuous reception paging cycle.

12. The communications device of claim 8, the at least one power conservation mechanism implemented on the entity comprising:
  bundling data for transmission to the communications network.

13. The communications device of claim 8, the at least one power conservation mechanism implemented on the entity comprising:
  adjusting a maximum transfer unit size for data to be transmitted.

14. The communications device of claim 8, the at least one power conservation mechanism implemented on the entity comprising:
  reducing a number of paging multiframes monitored for incoming calls.

15. The communications device of claim 8, the operations further comprising:
  when the communications device in a conserve mode, disabling a receiver of the communications device for a higher percentage of time than when the communications device is not in the conserve mode.

16. A non-transitory computer-readable storage medium having stored thereon executable instructions that cause a processor executing the executable instructions to effectuate operations comprising:
  receiving a request for registration in a conserve mode from a communications device;
  engaging in registration with the communications device;
  based on the conserve mode of the communications device, initiating at least one power conservation mechanism on an entity other than the communications device in a network;
  causing power to be conserved on the communications device as long as the communications device operates within the network by having the entity implement the at least one power conservation mechanism; and
  providing an indication that the at least one power conservation mechanism was implemented to the communications device,
  wherein the network comprises at least one of a long term evolution network, a universal mobile telecommunications system network, or a global system for mobile communication network.

17. The non-transitory computer-readable storage medium entity of claim 16, the operations further comprising:
  providing an indication of a threshold, wherein an intended recipient of the provided threshold is the communications device.

18. The non-transitory computer-readable storage medium entity of claim 16, wherein:
  the communications device is configurable to implement at least one conservation mechanism on the communications device, wherein the conservation mechanism is coordinated with the at least one power conservation mechanism.

* * * * *